United States Patent
Kyung et al.

(10) Patent No.: US 7,573,861 B2
(45) Date of Patent: Aug. 11, 2009

(54) MOBILE NETWORK IDENTIFICATION SYSTEM AND METHOD

(75) Inventors: Chan Ho Kyung, Inchon (KR); Jong Hoe Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 660 days.

(21) Appl. No.: 10/751,252

(22) Filed: Dec. 30, 2003

(65) Prior Publication Data
US 2005/0025115 A1    Feb. 3, 2005

(30) Foreign Application Priority Data
Jul. 10, 2003    (KR) .................... 10-2003-0046942

(51) Int. Cl.
*H04J 3/24* (2006.01)
(52) U.S. Cl. .................................... 370/349
(58) Field of Classification Search ........................ None
See application file for complete search history.

(56) References Cited

U.S. PATENT DOCUMENTS

| | | | |
|---|---|---|---|
| 5,699,408 A | 12/1997 | Krolopp et al. | 375/59 |
| 6,122,525 A | 9/2000 | Krolopp et al. | 455/553 |
| 6,339,588 B1* | 1/2002 | Katsuragawa | 370/311 |
| 6,445,929 B2* | 9/2002 | Chandnani et al. | 455/461 |
| 7,079,834 B2* | 7/2006 | Kyung et al. | 455/410 |
| 2004/0236849 A1* | 11/2004 | Cooper et al. | 709/224 |

FOREIGN PATENT DOCUMENTS

| EP | 1 041 844 A | 10/2000 |
|---|---|---|
| EP | 1041844 A2 | 10/2000 |

OTHER PUBLICATIONS

GSM Europe, Technical Assessments of Two Case Scenarios for the Introduction of 3 Digit MNCs, downloadable from the internet, pp. 1-11, Jul. 2001.*
"Digital Cellular Telecommunications System . . . (7.7.0 Release 1998); ETSI TS 100 927", Jun. 2002, XP014005712, p. 8, line 16—p. 11, line 39.

* cited by examiner

*Primary Examiner*—Frank Duong
(74) *Attorney, Agent, or Firm*—Lee, Hong, Degerman, Kang & Waimey

(57) ABSTRACT

A method of communicating a variable length mobile network code (MNC) from a mobile communications network to a mobile station is provided. The method comprises transmitting a message comprising at least one of a first field and a second field, wherein the first field indicates whether the MNC is greater than a fixed length (2 digits). The first field further indicates whether the second field is included in the message.

23 Claims, 10 Drawing Sheets

MCC  Mobile Country Code
MNC Mobile Network Code
MSIN Mobile Station Identifier Number
NMSI National Mobile Station Identity
IMSI International Mobile Station Identity

FIG. 6A

MSG_TAG ESPM

| Field | Length [bits] |
|---|---|
| PILOT_PN | 9 |
| CONFIG_MSG_SEQ | 6 |
| DELETE_FOR_TMSI | 1 |
| USE_TMSI | 1 |
| PREF_MSID_TYPE | 2 |
| MCC | 10 |
| IMSI_11_12 | 7 |
| ... | ... |
| IMSI_10_INCL | 1 |
| IMSI_10 | 0 or 4 |

FIG. 6B

MSG_TAG: A41SPM

| Field | Length [bits] |
|---|---|
| PILOT_PN | 9 |
| CONFIG_MSG_SEQ | 6 |
| SID | 15 |
| NID | 16 |
| ... | ... |
| IMSI_10_INCL | 1 |
| IMSI_10 | 0 or 4 |

FIG. 6C

MSG_TAG: MCRRPM

| Field | Length [bits] |
|---|---|
| PILOT_PN | 9 |
| CONFIG_MSG_SEQ | 6 |
| BASE_ID | 16 |
| ... | ... |
| IMSI_10_INCL | 1 |
| IMSI_10 | 0 or 4 |

FIG. 7

| Decimal Digit | Binary Number |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 0 | 1010 |

FIG. 8A

MSG_TAG: ORM

| Field | Length [bits] |
|---|---|
| MOB_TERM | 1 |
| SLOT_CYCLE_INDEX | 3 |
| MOB_P_REV | 8 |
| ... | ... |
| 3 DIGIT_MNC_IND | 1 |

FIG. 8B

MSG_TAG: PRM

| Field | Length [bits] |
|---|---|
| MOB_TERM | 1 |
| SLOT_CYCLE_INDEX | 3 |
| MOB_P_REV | 8 |
| ... | ... |
| 3 DIGIT_MNC_IND | 1 |

FIG. 8C

MSG_TAG: RGM

| Field | Length [bits] |
|---|---|
| REG_TYPE | 4 |
| SLOT_CYCLE_INDEX | 3 |
| MOB_P_REV | 8 |
| ... | ... |
| 3 DIGIT_MNC_IND | 1 |

MOBILE NETWORK IDENTIFICATION SYSTEM AND METHOD

CROSS REFERENCE TO RELATED APPLICATIONS

Pursuant to 35 U.S.C. § 119(a), this application claims the benefit of earlier filing date and right of priority to Korean Patent Application No. 2003-46942, filed on Jul. 10, 2003, the content of which is hereby incorporated by reference herein in its entirety.

BACKGROUND OF THE INVENTION

1. Field of the Invention

The present invention relates to a mobile network identification system and, more particularly, to a method of using an international mobile station identity (IMSI) to identify a mobile communications network (i.e., a base station) to a mobile communications device in a mobile communications network.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G is used to refer to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G is commonly used to refer to the digital cellular systems currently being developed. Recently, third-generation (3G) CDMA communication systems have been proposed including proposals, such as cdma2000 and W-CDMA. These 3G communication systems are conceptually similar to each other with some significant differences.

A cdma2000 system is a third-generation (3G) wideband, spread spectrum radio interface system which uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 1 illustrates a cdma2000 network architecture, wherein a subscriber uses a mobile communications device or a Mobile Station (MS) to access network services. The Mobile Station may be a portable communications unit, such as a hand-held cellular phone, a communication unit installed in a vehicle, or even a fixed-location communications unit.

The electromagnetic waves from the Mobile Station are transmitted by the Base Transceiver System (BTS) also known as node B. The BTS consists of radio devices such as antennas and equipment for transmitting radio waves. The Base Controller Station (BSC) receives the transmissions from one or more BTS's. The BSC provides control and management of the radio transmissions from each BTS by exchanging messages with the BTS and the Mobile Switching Center (MSC) or Internal IP Network. The BTS's and BSC are part of the Base Station (BS).

The BS exchanges messages with and transmits data to a Circuit Switched Core Network (CSCN) and Packet Switched Core Network (PSCN). The CSCN Provides traditional voice communications and the PSCN provides data communications for Internet applications and multimedia services.

The Mobile Switching Center (MSC) portion of the CSCN provides switching for traditional voice communications to and from an Mobile Station and may store information to support these capabilities. The MSC may be connected to one or more BS's as well as other public networks, for example a Public Switched Telephone Network (PSTN) or Integrated Services Digital Network (ISDN). A Voice Location Register (VLR) is used to retrieve information for handling voice communications to or from a visiting subscriber. The VLR may be within the MSC and may serve more than one MSC.

A user identity is assigned to the Home Location Register (HLR) of the CSCN for record purposes such as subscriber information, for example Electronic Serial Number (ESN), Mobile Directory Number (MDR), Profile Information, Current Location, and Authentication Period. The Authentication Center (AC) manages authentication information related to the Mobile Station. The AC may be within the HLR and may serve more than one HLR. The interface between the SC and the HLR/AC is an IS-41 standard interface.

The Packet Data Serving Node (PDSN) portion of the PSCN provides routing for packet data traffic to and from Mobile Station. The PDSN establishes, maintains, and terminates link layer sessions to the Mobile Station's and may interface with one of more BS and one of more PSCN.

The Authentication, Authorization and Accounting (AAA) Server provides Internet Protocol authentication, authorization and accounting functions related to packet data traffic. The Home Agent (HA) provides authentication of MS IP registrations, redirects packet data to and from the Foreign Agent (FA) component of the PDSN, and receives provisioning information for users from the AAA. The HA may also establish, maintain, and terminate secure communications to the PDSN and assign a dynamic IP address. The PDSN communicates with the AAA, HA and the Internet via an Internal IP Network.

FIG. 2 shows a layered architecture diagram of the cdma2000 system. Layered architecture is a form of hierarchical modularity used in data network design. All major emerging communication network technologies rest on the layers of the International Organization for Standardization (ISO/OSI) model, illustrated in FIG. 2. A layer performs a category of functions or services. The OSI model defines a Physical Layer 20 (Layer-1) which specifies the standards for the transmission medium, a Link Layer 30 (Layer-2), a Network Layer 40 (Layer-3) which implements routing and flow control for the network, a Transport Layer 50 (Layer-4) and Upper Layers 60 (Layers-5 to 7).

Link Layer 30 and Data Link Protocols (DLP) are used to mitigate the effects of impairments introduced by the physical transmission medium. A Radio Link Protocol (RLP) is designed for the wireless system to deal specifically with the types of impairments found on the radio link and comprises mechanisms to deal with errors on the communications link, delays encountered in transmitting information, lost information, bandwidth conservation, and contention resolution.

The Transport Layer 50 provides reliable and transparent transfer of data between end points. It provides end-to-end error recovery and flow control. For the Internet based protocol model, the Transport Control Protocol (TCP) mainly corresponds to the Transport Layer of the OSI model.

Referring to FIG. 3, a data link protocol architecture layer for a wireless network, and more particularly for a cdma2000 system is provided. The upper layers 60, corresponding to Layer-5 to 7, contain three basis services; voice services, end-user data-bearing services and signaling. Voice services 62 include PSTN access, mobile-to-mobile voice services, and Internet telephony. End-user data-bearing services are services that deliver any form of data on behalf of a mobile end user and include packet data applications (e.g., IP service) 61, circuit data applications (e.g., asynchronous fax and B-ISDN emulation services) 63, and SMS. Signaling services control all aspects of mobile operation.

Voice services 62 may utilize directly the services provided by the LAC services. Signaling services 70 are illustrated over layers 40, 50 and 60 to indicate that the signaling information is exchanged between all layers corresponding to Layer-3 to 7.

The Transport Layer 50, corresponding to Layer-4, includes the Transport Control Protocol (TCP) 51 and the User Datagram Protocol (UDP) 52. A Hyper Text Transport Protocol (HTTP), a Real-time Transport Protocol (RTP), or other protocols may also be present.

The Link Layer 30, corresponding to Layer-2, is subdivided into the Link Access Control (LAC) sublayer 32 and the Medium Access Control (MAC) sublayer 31. The link layer provides protocol support and control mechanisms for data transport services and performs the functions necessary to map the data transport needs of the upper levels 60 into specific capabilities and characteristics of the physical layer 20. The Link Layer may be viewed as an interface between the upper layers and the Physical Layer 20.

The separation of MAC 31 and LAC 32 sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer manages point-to point communication channels between upper layer entities and provides framework to support a wide range of different end-to-end reliable link layer protocols.

The MAC sublayer 31 facilitates complex multimedia, multi-services capabilities of 3G wireless systems with Quality of Service (QoS) management capabilities for each active service. MAC Control States 35 includes procedures for controlling the access of data services (packet and circuit) to the physical layer 20, including the contention control between multiple services from a single user, as well as between competing users in the wireless system.

Best Effort Delivery 33 provides for reasonably reliable transmission over the radio link layer using a Radio Link Protocol (RLP) for a best-effort level of reliability. Multiplexing and Quality of Service (QoS) Control 34 is responsible for enforcement of negotiated QoS levels by mediating conflicting requests from competing services and the appropriate prioritization of access requests.

The Physical Layer 20, corresponding to Layer-1, is responsible for coding and modulation of data transmitted over the air. The Physical Layer 20 conditions digital data from the higher layers so that the data may be transmitted over a mobile radio channel reliably. The Physical Layer 20 maps user data and signaling, which are delivered by the MAC sublayer 31 over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

The International Telecommunications Union (ITU) originally spearheaded the 3G (Third Generation) standard for mobile communications systems, pursuant to the International Mobile Telephony 2000 (IMT2000) project. IMT2000 provides a vision for a single global standard for wireless networks perceived as the global 3G system. In a 3G system, the next generation of mobile communications systems will offer enhanced services, such as multimedia and video. The main 3G technologies include Universal Mobile Telecommunications System (UMTS) and CDMA2000™.

UMTS provides an enhanced range of multimedia services. UMTS will speed convergence between telecommunications, information technology, media and content industries to deliver new services and create fresh revenue generating opportunities. UMTS will deliver low cost, high capacity mobile communications offering data rates as high as 2 Mbps under stationary conditions with global roaming and other advanced capabilities. The specifications defining UMTS are formulated by Third Generation Partnership Project (3GPP).

The CDMA2000™ standards family defines the use of Code Division Multiple Access (CDMA) technology to meet the requirements for 3G wireless communication systems. These standards have been developed through comprehensive proposals from Qualcomm. CDMA2000 was one of the first 3G IMT-2000 technologies to be commercially deployed, in late 2000. It offers twice the voice capacity and data speed (up to 307 Kbps) on a single 1.25 MHz (1X) carrier in a new or an existing spectrum. CDMA2000 1X is also known as IS-2000, MC-1X and IMT-CDMA MultiCarrier 1X and 1xRTT. The specifications defining CDMA2000 are formulated by Third Generation Partnership Project 2 (3GPP2).

International Telecommunications Union-Telecommunication Standardization Sector (ITU-T) is an international body that develops worldwide standards for telecommunications technologies. These standards are grouped together in series, which are prefixed with a letter indicating the general subject and a number specifying the particular standard. ITU-T Series E, for example, deals with the overall network operation, telephone service, service operation and human factors. Particularly, ITU-T E.212 provides for an International Mobile Subscriber Identity (IMSI).

IMSI is a unique identifier allocated to each mobile subscriber in a GSM and UMTS network. IMSI includes a Mobile Country Code (MCC), a Mobile Network Code (MNC) and a Mobile Station Identification Number (MSIN), as illustrated in FIG. 4. MCC is a 3-digit number uniquely identifying a given country. MNC is either a 2 or 3-digit number used to uniquely identify a given network from within a specified country. MNC is used in identifying various networks in a country using the same MCC.

The manufacturer typically assigns the MSIN. The MSIN comprises a maximum of 10 digits, and is used in identifying a mobile communications device or mobile station in each network using the same MNC. The combination of the MNC and the MSIN is referred to as national mobile station identity (NMSI), which uniquely identifies a mobile station within its home country.

Generally, an IMSI is constructed with maximum 15 digits. IMSI as illustrated in FIG. 4 is used for assigning an internationally generic identifier number to a mobile station. Hence, even when a mobile station is roaming internationally, a servicing base station or communications network can determine in which network and country a mobile station is registered, based on the values of MCC and MNC. Thus, IMSI simplifies and facilitates billing practices in a roaming network, whether locally or internationally.

In the cdma2000 system, IMSI is classified into two types. A first type is class 0 IMSI and the other is class 1 IMSI. Class 0 IMSI has 15 digits, wherein class 1 IMSI has digits less than fifteen. Referring to FIG. 5, a class 1 IMSI is illustrated. IMSI includes a MCC and an IMSI_S, wherein the MCC field coincides with $11^{th}$ and $12^{th}$ digits of IMSI (IMSI_11_12). As shown, in this example, the overall length of IMSI is 13 digits. MNC and MSIN fields are 2 digits and 8 digits, respectively. Thus, the length of IMSI_S of cdma2000 is 10 digits. Hence, IMSI_11_12 coincides with the least two significant digits of MCC.

Typically, IMSI_S corresponds to MSIN as provided in ITU-T E.212 and is constructed with 10 digits. If MSIN is 10 digits, IMSI_S is constructed with 10 digits. If MSIN is less than 10 digits, however, or if the overall length of IMSI is 10 digits or is greater than 10 digits, IMSI_S includes the least significant 10 digits of the IMSI. If the total length of IMSI is less than 10 digits, at least one padding value ('0') is added in most significant position of IMSI to reconstruct the IMSI to have a total of 10 digits. The 10 digits are set as IMSI_S.

IMSI_11_12 is a value indicating $11^{th}$ and $12^{th}$ digits of IMSI, and is typically required to comprise the MNC, if MNC is 2-digits. If the MNC is 3-digits, IMSI_11_12 is required to comprise a portion of MNC. FIG. 5 shows how the $11^{th}/12^{th}$ digits of IMSI can comprise a portion of MNC. When IMSI_11_12 comprises a portion of MNC in the cdma2000 system, a base station having received IMSI from a mobile station is unable to extract the MNC from the IMSI, because base station is not configured to distinguish between an IMSI that includes a 2-digit MNC or a 3-digit MNC.

Particularly, if the MNC used for the mobile station is 3-digits, the base station will fail to determine the MNC based on IMSI_11_12, only. If the base station cannot extract the MNC, then it cannot identify a network to which the mobile station belongs. Therefore, the base station will be unable to confirm whether the mobile station is roaming.

As such, the base station will be unable to determine the network and the country to which the mobile station belongs. Consequently, the base station cannot determine the billing information based on the international roaming service of the corresponding mobile station. A method and system is needed to overcome the above problems associated with a variable length MNC.

SUMMARY OF THE INVENTION

A method of communicating a variable length mobile network code (MNC) from a mobile communications network to a mobile station is provided. The method comprises transmitting a message comprising at least one of a first field (IMSI_10_INCL) and a second field (IMSI_10), wherein the first field (IMSI_10_INCL) indicates whether the MNC is greater than a fixed length (2 digits). The first field (IMSI_10_INCL) further indicates whether the second field (IMSI_10) is included in the message.

When the network supports the MNC greater than the fixed length (>2 digits), the first field (IMSI_10_INCL) is set to a first logic level ("1") to indicate that the second field (IMSI_10) is included. When the network supports the MNC not greater than the fixed length (=2 digits), the first field (IMSI_10_INCL) is set to a second logic level ("0") to indicate that the second field (IMSI_10) is not included. The second field comprises a first part of the MNC.

In one embodiment, the first part comprises a least significant digit of the MNC and the most significant digits of the MNC are transmitted to the mobile station in a third field (IMSI_11_12). Upon receiving the second field (IMSI_10) and the third field (IMSI_11_12), the mobile terminal determines a first value of MNC supported by the network and compares the first value of MNC with a second value of MNC stored in the mobile terminal.

If the first value is different from the second value then the mobile terminal is roaming. The message is sent over at least one of a paging channel and a broadcast control channel (BCCH). The message can be an extended system parameters message (ESPM), an ANSI-41 system parameters message (A41SPM), or a MC-RR parameters message (MCRRPM). Value of the first part is determined based on an association between a decimal value and a binary value. The binary value comprises 4 bits, for example.

In another embodiment, a method of supporting a variable length mobile network code (MNC) in a mobile terminal is provided. The method comprises receiving a first value (IMSI_11_12) representing a mobile network code (MNC) of a fixed length (2 digits) from a network; and receiving a second value (IMSI_10_INCL) which identifies whether the MNC is greater than the fixed length, wherein if the network supports the MNC greater than the fixed length (>2 digits), then the second value is equal to a first logic level ("1") to indicate that a third value (IMSI_10) will be sent from the network.

In one embodiment, the method further comprises receiving the third value (IMSI_10) from the network; and determining the MNC value based on the first (IMSI_11_12) and third (IMSI_10) values, wherein the first value (IMSI_11_12) comprises the most significant digits of the MNC and the second value (IMSI_10) comprises the least significant digit of the MNC. The MNC is compared with a stored MNC value to determine a roaming status.

In accordance with yet another embodiment, a method of communicating a variable length mobile network code (MNC) from a mobile station to a mobile communications network is provided. The method comprises transmitting a message comprising a first field (3 DIGIT_MNC_IND), wherein the first field (3 DIGIT_MNC_IND) indicates whether the MNC is greater than a fixed length (2 digits). When the MNC is greater than the fixed length (>2 digits), the first field (3 DIGIT_MNC_IND) is set to a first logic level ("1").

When the MNC not greater than the fixed length (=2 digits), the first field (3 DIGIT_MNC_IND) is set to a second logic level ("0"). The message can be an origination message (ORM), a registration message (RGM), or a paging response message (PRM). The mobile station is associated with an international mobile station identity (IMSI), wherein the IMSI comprising a mobile country code (MCC) field, a IMSI_11_12 field, and a IMSI_S field, wherein at least one of the IMSI_11_12 field and the IMSI_S field comprise the MNC, and wherein when the first field indicates that the MNC is greater than the fixed length, the network extracts a first part of the MNC from the IMSI_11_12 field and a second part of the MNC from a most significant position of IMSI_S field.

In another embodiment, a method of extracting an MNC from IMSI identifying a mobile station is provided. The method comprises determining whether the MNC is greater than a fixed length (3-digit MNC) based on a value of an indicator field (IMSI_10_INCL) included in a message transmitted from the mobile station; reading first most significant digits of MNC from a first field (IMSI__11__12) of the IMSI; reading least most significant digit of MNC from a first most significant position of a second field (IMSI_S) of the IMSI, when the indicator field is set ('1'); and calculating the MNC based on values in the first and second fields of the IMSI.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 6A to 6C are exemplary structural diagrams of messages for transferring information of a mobile network code (MNC) from a base station to a mobile station, according to one embodiment of the present invention;

FIG. 7 is a table of mapping relation of field IMSI__10 for representing third digit of MNC, according to one embodiment of the present invention;

FIGS. 8A to 8C are structural diagrams of messages for transferring information of a mobile network code (MNC) from a mobile station to a base station according to one embodiment of the present invention;

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
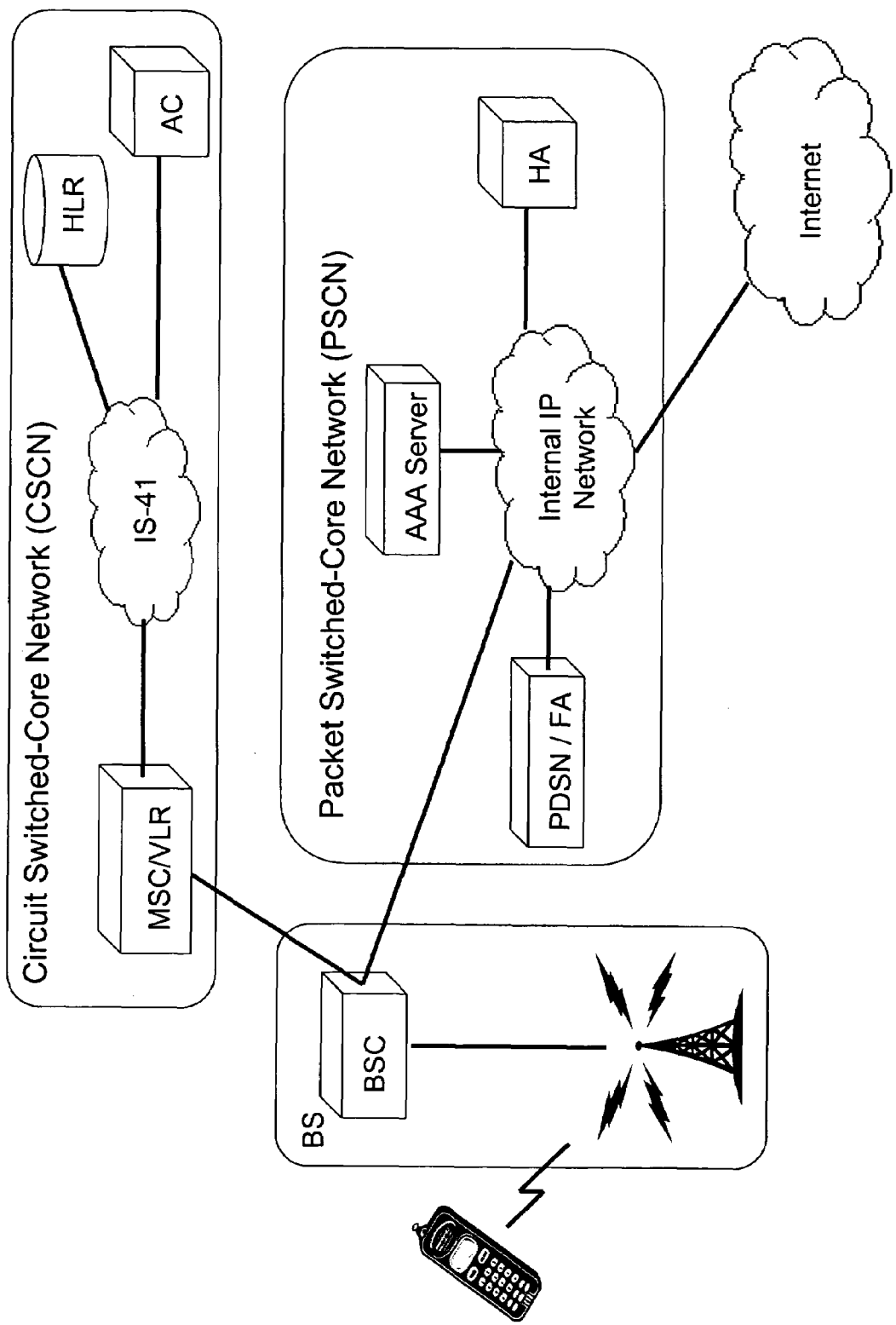
FIG. 1 illustrates a cdma2000 network architecture.
Figure 2:
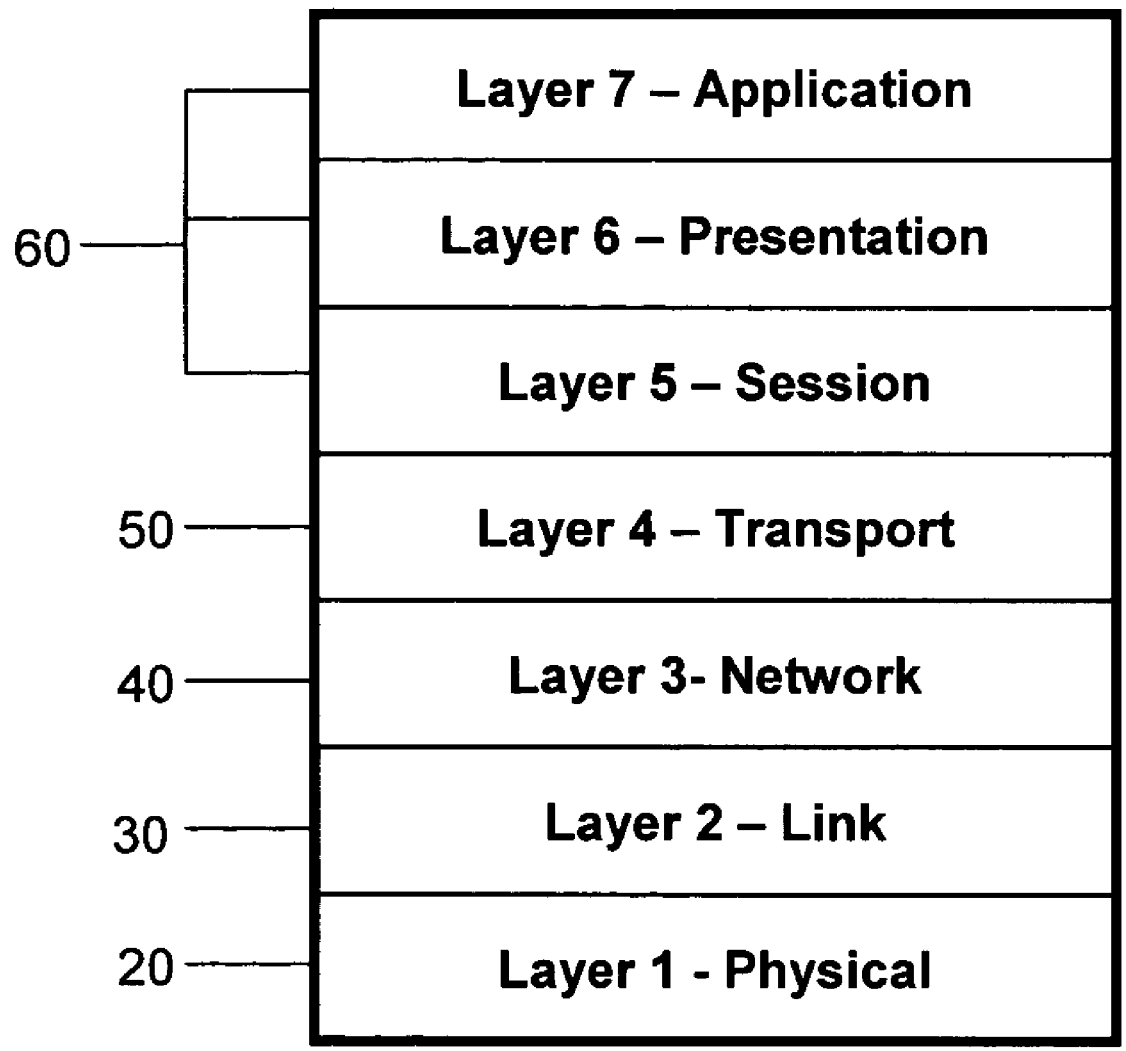
FIG. 2 illustrates a layered architecture diagram of the cdma2000 system.
Figure 3:
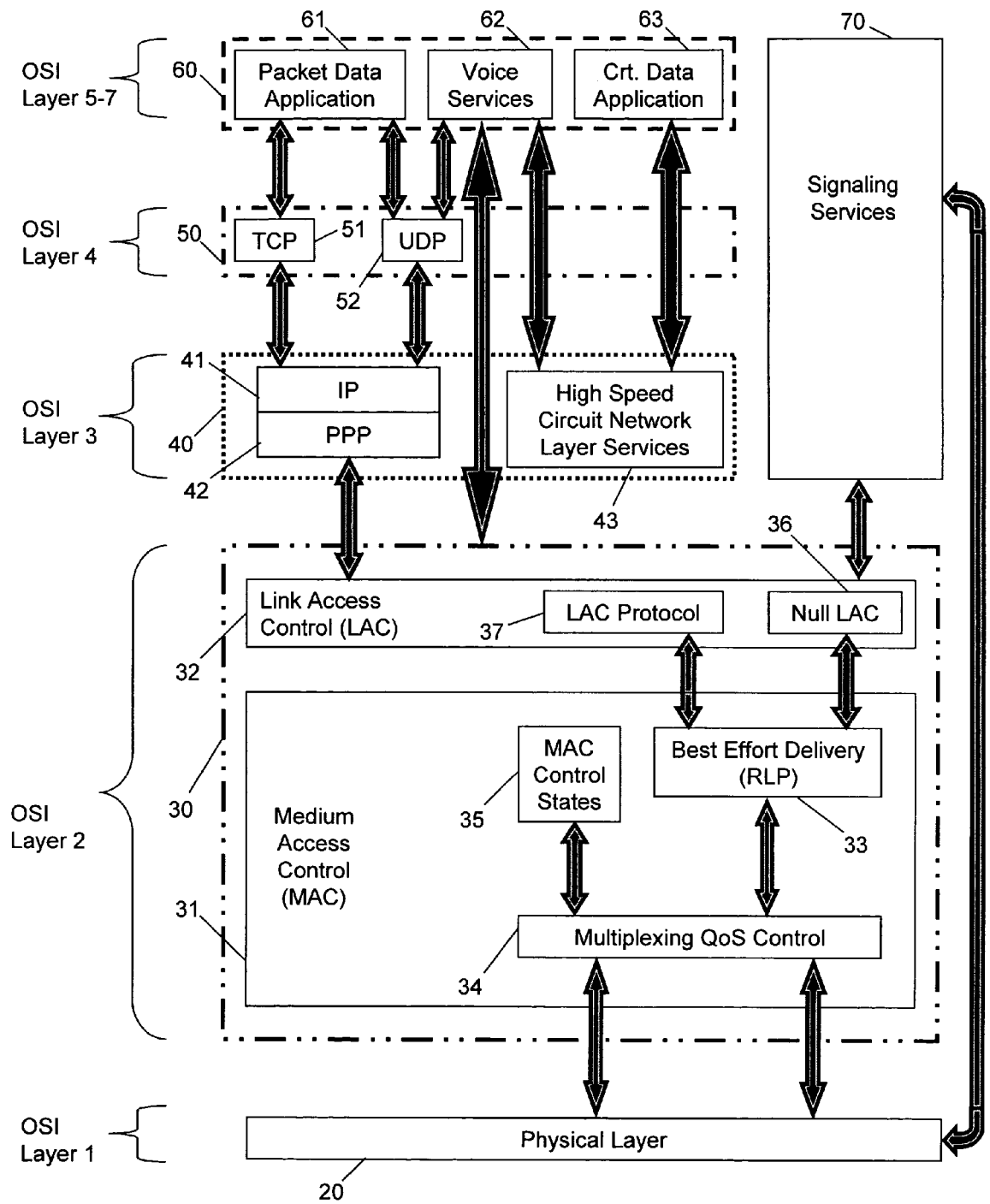
FIG. 3 illustrates the data link protocol architecture layer for a wireless network, and more particularly for a cdma2000 system.
Figure 4:
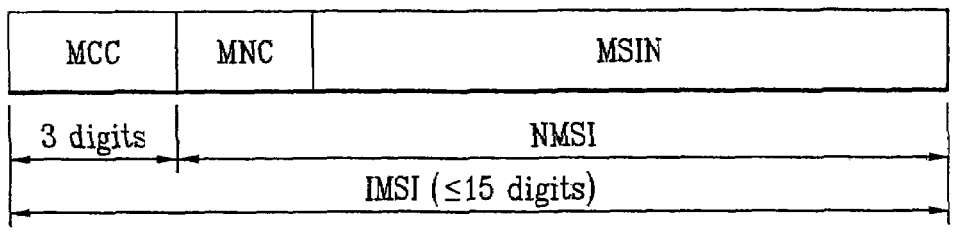
FIG. 4 is a diagram of a structure of IMSI as provided in ITU-T E.212.
Figure 5:
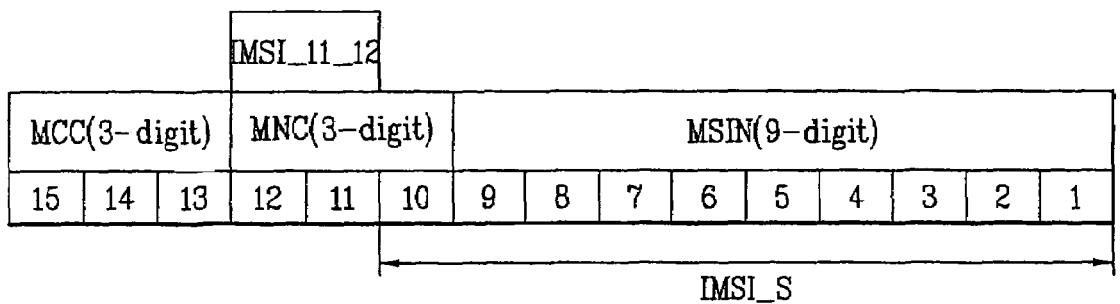
FIG. 5 is a diagram of showing a case that an $11^{th}/12^{th}$ positions of IMSI comprise a portion of MNC.

To aid describing the present invention, certain exemplary parameter names, values, lengths and other attributes are being used to describe the channels, messages and fix or variable identifiers communicated between mobile and base stations. It should be noted that such parameter names and values are for illustration purposes only, and that other names may be used to describe the same or similar function.

The present invention is directed to a method of identifying a variable length MNC included in an IMSI structure. Accordingly, a base station utilizing variable length MNC, such as a 3- or 2-digits MNC, notifies a mobile station of the length of the MNC, using a specific parameter message transferred on, for example, a paging channel or a broadcast control channel (BCCH). The specific parameter message transferred on the paging channel or the broadcast control channel (BCCH) are explained by referring to FIGS. 6A to 6C as follows.

Referring to FIGS. 6A to 6C, exemplary structural diagrams of messages for transferring MNC information, regarding length and/or value of MNC, from a base station to a mobile station are provided. According to one embodiment of the present invention, structures of extended system parameters message (hereinafter abbreviated ESPM), ANSI-41 system parameters message (hereinafter abbreviated A41SPM), and MC-RR parameters message (hereinafter abbreviated MCRRPM) are shown in FIGS. 6A to 6C, respectively.

A field IMSI__10_INCL indicates the length of MNC, for example. The field IMSI__10 indicates a digit value at IMSI of MNC inserted in ESPM, A41SPM, or MCRRPM. The value of the field IMSI__10_INCL indicates the length of MNC using 1 bit. In one embodiment, the value of the field IMSI__10_INCL is set to '1', for example, if the length of MNC is 3-digits; and IMSI__10_INCL is set to '0', for example, if the length of MNC is 2-digits.

In one embodiment, 4 bits are used for the field IMSI__10 to provide the least significant digits of MNC. If the length of MNC is 2-digits, for example, the value of the field IMSI__10 is not set. It is noteworthy that one or more embodiments of the present invention are described herein in association with an exemplary number of digits and illustrative figures corresponding to exemplary structures. This is for the purpose of example, however. Other embodiments of the invention may be practiced with structures differing in format and number of bits provided here without deviating from the concepts and principals set forth here.

For example, if the length of MNC is 3-digits, the base station utilizes one of the parameters messages having the structures shown in FIGS. 6A to 6C. Values of fields IMSI__10_INCL and IMSI__10 of the usable parameters message are set and the set field values are then transferred to the mobile station. In this exemplary embodiment, the value of the field IMSI__10_INCL is set to '1' and the value of the field IMSI__10 is set to one of the exemplary binary values listed in table of FIG. 7.

FIG. 7 provides a mapping table for representing a third digit of MNC, in which binary numbers mapped to decimal digits are values that may be assigned to the field IMSI__10. If the length of MNC is 2-digits, the value of the field IMSI__10_INCL is set to '0' and no value is set for the field IMSI__10. If the length of MNC is 3-digits (e.g., '123'), the base station sets the value of the field IMSI__10_INCL to '1' and the value of the field IMSI__10 to '0011' indicating a decimal number of '3', according to the mapping table. For instance, if a third digit of MNC is '9', '1001' is set for the field IMSI__10.

Consequently, in case of utilizing a 3-digit MNC, the mobile station provided with MCC and IMSI__11__12 can determine the value of MNC based on the value of the field IMSI__10. Hence, the mobile station determines whether it is roaming or not, by comparing the received MNC with MNC of its own.

In another embodiment, a base station utilizing a 3- or 2-digit MNC can notify a mobile station of the MNC information using an origination message (ORM), registration message (RGM), or paging response message (PRM) as respectively illustrated in FIG. 8A, FIG. 8B, and FIG. 8C. To accomplish this, an indicator field 3_DIGIT_MNC_IND, for example, indicating the length of MNC is added in the origination message (ORM), registration message (RGM), or paging response message (PRM).

In certain embodiments, the indicator field 3_DIGIT_MNC_IND is 1 bit. If the length of MNC is 3 digits, the value of the indicator field 3_DIGIT_MNC_IND is set to '1'. If the length of MNC is 2 digits, the value of the indicator field 3_DIGIT_MNC_IND is set to '0', for example. In case of using a 3-digit MNC, the base station is notified of the length of MNC from the mobile station. Hence, the base station determines the 2-digit value of MNC from IMSI_11_12 and the remaining 1-digit value by reading a most significant digit of IMSI_S to determining whether the corresponding mobile station is roaming.

In another embodiment, the base station can determine the length of MNC of each country based on the MCC value. Therefore, upon receiving IMSI from the mobile station, the base station can determine the length of MNC by checking MCC of IMSI provided by the mobile station. Hence, the base station can determine the 2-digit value of MNC from IMSI_11_12 and the remaining 1-digit value by reading the most significant digit of IMSI_S. The process of extracting MNC based on the MNC information is explained below.

After receiving one of the origination message (ORM), registration message (RGM), and paging response message (PRM) transmitted from the mobile station, the base station determines the length of MNC by extracting the value of the indicator field 3_DIGIT_MNC_IND inserted in the corresponding message. When the length of MNC is 3 digits, for example, the base station finds the most two significant digits of MNC from IMSI_11_12 and extracts the least significant digit of MNC from the most significant position of IMSI_S. The base station then reads the 3-digit MNC to determine whether the current mobile station is roaming or not.

In some embodiments, after receiving ESPM, A41SPM, or MCRRPM transmitted on paging channel or broadcast control channel (BCCH) from the base station, the mobile station can determine the length of MNC by extracting the value of the field IMSI_10_INCL inserted in the corresponding parameters message and the least significant digit value of MNC by extracting the value of the field IMSI_10.

Figure 9:
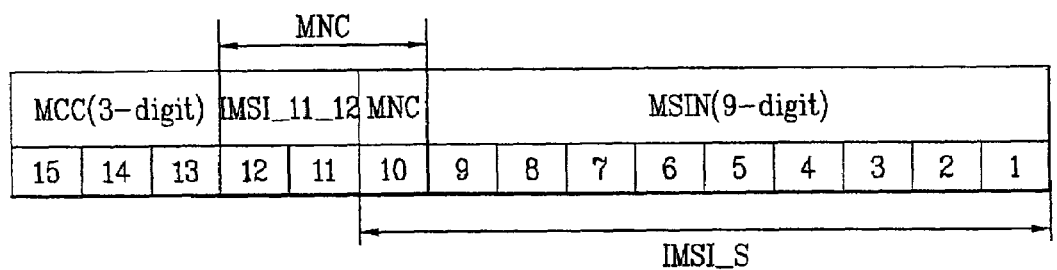
FIG. 9 is a diagram for explaining a process that a base station uses to extract MNC a class 0 IMSI, according to one embodiment of the present invention.

Referring to FIG. 9, for example, if MNC used by a mobile station is 3 digits, a base station finds the 2 most significant digits of MNC from IMSI_11_12 and the least significant digit from the most significant position of IMSI_S, for example. The mobile station thus recognizes a 3-digit MNC, thereby determining whether the mobile station is roaming.

Figure 10:
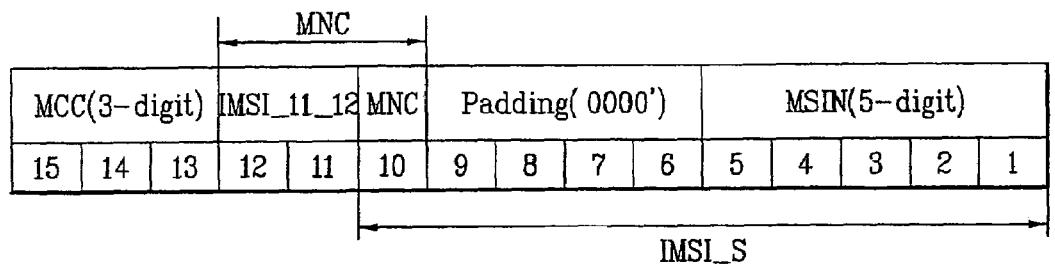
FIG. 10 is a diagram for explaining a process that a base station uses to extract MNC from a class 1 IMSI, according to one embodiment of the present invention.

Referring to FIG. 10, MNC is 3 digits in a class 1 IMSI. Therefore, MSIN of a mobile station has a number smaller than 9 digits. Hence, the mobile station sets the most significant position of IMSI_S to comprise the least significant digit of MNC. MSIN is included in the least significant portion of IMSI, and padding values are added to the left of the MSIN. As shown, in this exemplary embodiment, MSIN is 5 digits. The most significant position of IMSI_S comprises the least significant digit of MNC and padding values ('0000') are inserted in $2^{nd}/3^{rd}/4^{th}/5^{th}$ most significant positions of IMSI_S. Further, MSIN is inserted in the least significant 5 positions of IMSI_S.

Figure 11:
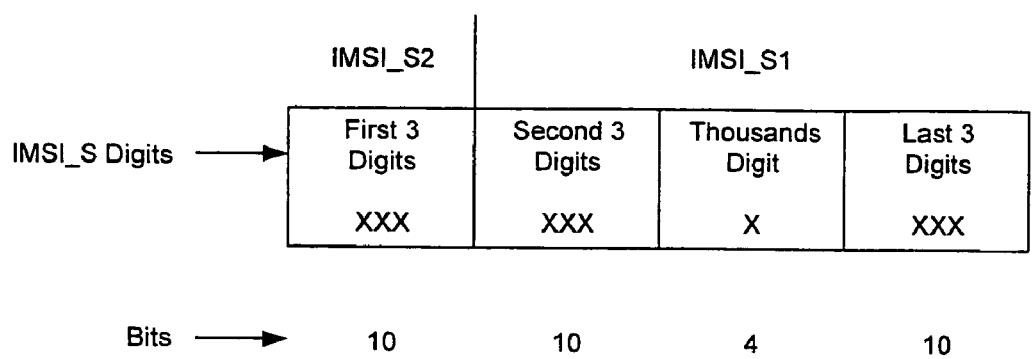
FIG. 11 is a diagram illustrating the bit structure of an IMSI field, in accordance with one embodiment of the invention.

As such, the base station can extract the most significant 2 digits of MNC from IMSI_11_12 and the remaining least significant digit of MNC from the most significant position of IMSI_S. Referring to FIG. 11, the IMSI_S field can be divided into two separate portions, namely IMSI_S1 and the IMSI_S2, comprising the IMSI_S field's least and most significant bits, respectively.

As shown, in an exemplary embodiment, the first most significant three digits of IMSI_S are represented by 10 bits in the IMSI_S2 portion, the second three digits are represented by 10 bits in the IMSI_S1 portion, the thousands digit (i.e., the $4^{th}$ least significant digit of IMSI_S) is represented by 4 bits, and the least 3 significant positions of IMSI_S are represented by 10 bits. Thus, IMSI_S of a mobile station may be represented by a total of 34 bits.

In one embodiment, when the base station determines that the MNC embedded in the IMSI received from the mobile station is a 3-digit MNC (i.e., when the indicator field 3-DIGIT_MNC_IND is set to '1') then the following operation is performed to extract the MNC from the IMSI. First, the base station extracts the first most significant digits of MNC from the field IMSI_11_12. Second, by using the first 10 bits of the IMSI_S, the first digit of the IMSI_S can be derived by converting a 10-bit binary value to a decimal value, by adding 111 to the decimal number, dividing the result by 100, and taking its quotient with 10 being given the value of zero.

Accordingly, the base station making use of IMSI can notify the mobile station of the MNC information (length and/or least significant digit value of MNC). The mobile station can use this information for identifying a network in a specific country. Further, the mobile station can notify the base station of the length of MNC. Hence, the base station can determine the communications network regardless of the value of MNC. Therefore, both the base station and mobile stations can determine whether the mobile station is roaming or not and arrange billing accordingly.

Figure 12:
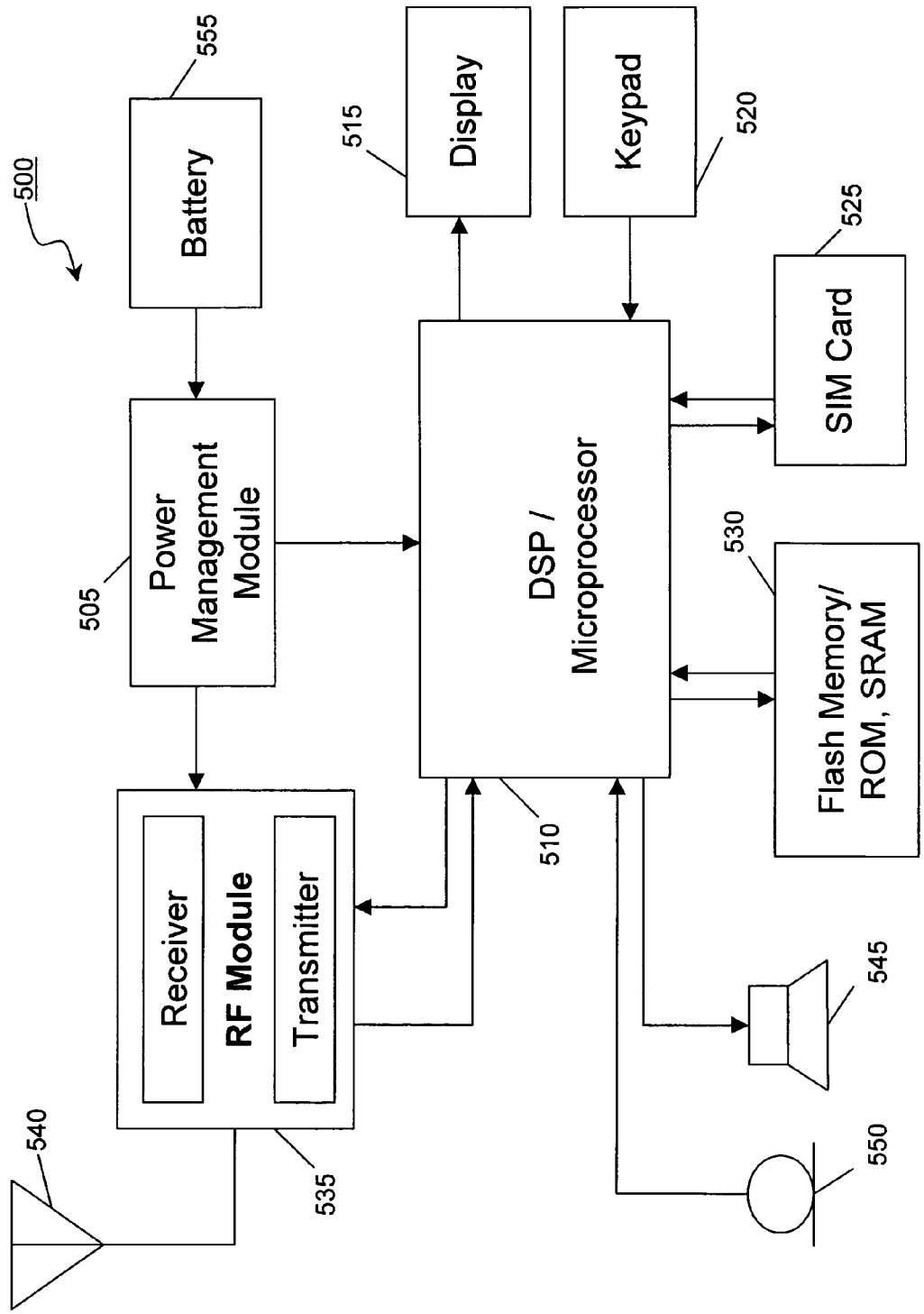
FIG. 12 illustrates a block diagram of mobile station according to a preferred embodiment of the present invention.

FIG. 12 illustrates a block diagram of mobile station according to the preferred embodiment of the present invention. Referring to FIG. 12, the mobile station 500 comprises a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF section 535, to initiate communication, for example, transmit radio signals comprising voice communication data. The RF section 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example.

It will be apparent to one skilled in the art that the preferred embodiments of the present invention can be readily implemented using, for example, a suitably programmed digital signal processor (DSP) or other data processing device, either alone or in combination with external support logic.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of communicating a mobile network code (MNC) from a mobile communications network to a mobile station for a wireless mobile communication, the method comprising:
    transmitting, at a base station, a message comprising a first field and a second field including a least significant digit of the MNC, wherein the MNC has a first length or a second length, the first length is greater than the second length, and wherein the first field indicates whether the MNC has the first length or the second length, and
    receiving, at the base station, a 15-digit International Mobile Station Identity (IMSI) constructed from an IMSI having fewer than 15 digits, wherein the 15-digit IMSI is padded with one or more zeros (0) for extending a length of the IMSI, having fewer than 15 digits, to 15 digits.

2. The method of claim 1, wherein the first field further indicates whether the second field is included in the message.

3. The method of claim 1, wherein when the network supports the MNC having the first length, the first field is set to a first logic level to indicate that the second field is included in the message.

4. The method of claim 1, wherein when the network supports the MNC having the second length, the second field is omitted in the message, and the first field is set to a second logic level to indicate that the second field is not included in the message.

5. The method of claim 1, wherein the mobile station is associated with an international mobile station identity (IMSI), wherein the IMSI comprising a mobile country code (MCC) field, a IMSI_11_12 field, and a IMSI_S field, wherein at least one of the IMSI_11_12 field and the IMSI_S field comprise the MNC, and wherein when the first field indicates that the length of the MNC is the first length, the network extracts a first part of the MNC from the IMSI_1112 field and a second part of the MNC from a most significant position of IMSI_S field.

6. The method of claim 1, wherein the least significant digit of the MNC is IMSI_10.

7. The method of claim 6, wherein the message further comprises a third field and most significant digits of the MNC are transmitted to the mobile station in the third field.

8. The method of claim 7, wherein upon receiving the second field and the third field, the mobile terminal determines a first value of MNC supported by the network and compares the first value of MNC with a second value of MNC stored in the mobile terminal.

9. The method of claim 8, wherein if the first value is different from the second value then the mobile terminal is roaming.

10. The method of claim 1, wherein the message is sent over at least one of a paging channel and a broadcast control channel (BCCH).

11. The method of claim 10, wherein the message is an extended system parameters message (ESPM).

12. The method of claim 10, wherein the message is an ANSI-41 system parameters message (A41SPM).

13. The method of claim 10, wherein the message is a MC-RR parameters message (MCRRPM).

14. The method of claim 1, wherein value of the least significant digit of the MNC is determined based on an association between a decimal value and a binary value.

15. The method of claim 14, wherein the binary value comprises 4 bits.

16. The method of claim 7, wherein the third field is an IMSI_11_12.

17. A method of supporting mobile network code (MNC) having two length types in a mobile terminal for a wireless mobile communication, the method comprising:
    a mobile station (MS) receiving a first value representing a mobile network code (MNC) of a first length from a network;
    the MS receiving a second value which identifies whether a length of the MNC is equal to the first length or a second length which is greater than the first length, and
    the MS adding padding bits to an International Mobile Station Identity (IMSI) having fewer than 15 digits to obtain a 15-digit padded IMSI; and
    the MS transmitting the obtained 15-digit padded IMSI to a base station;
    wherein if the second value is equal to a first logic level, the MS identifies the network supports the MNC having a length equal to the second length.

18. The method of claim 17, wherein the first value comprises the most significant digits of the MNC.

19. The method of claim 17, wherein the second value further indicates whether a third value is sent from the network,
    and wherein if the second value is equal to the first logic level, the method further comprising:
    receiving the third value from the network; and
    determining the MNC value based on the first and third values.

20. The method of claim 19, further comprising:
    comparing the determined MNC value with a stored MNC value to determine a roaming status.

21. The method of claim 19, wherein the third value comprises the least significant digit of the MNC.

22. A method of extracting a mobile network code (MNC) from a 15-digit international mobile station identity (IMSI) identifying a mobile station, the method comprising:

determining, at a base station, whether a length of the MNC is a first length which is greater than a second length based on a value of an indicator field included in a message transmitted from the mobile station;

reading, at the base station, first most significant digits of MNC from a first field of the IMSI;

reading, at the base station, least most significant digit of MNC from a most significant position of a second field of the 15-digit IMSI, when the indicator field is set to a first logic level; and calculating, at the base station, the MNC based on values in the first and second fields of the 15-digit IMSI, wherein, the 15-digit IMSI is transmitted from a the mobile station, and is generated from an IMSI having fewer than 15 digits by adding padding bits to the IMSI having fewer than 15 digits.

23. The method of claim 22, wherein the calculating comprises converting most significant digits of MNC from decimal to binary.

* * * * *